(12) United States Patent
Salciarini

(10) Patent No.: US 8,172,473 B2
(45) Date of Patent: May 8, 2012

(54) METHOD FOR MANUFACTURING A COSMETIC APPLICATOR, AN APPLICATOR, A PACKAGE INCLUDING THE APPLICATOR, AND A BATCH OF APPLICATORS

(75) Inventor: Christian Salciarini, Dames (FR)

(73) Assignee: Chanel Parfums Beaute, Neuilly-sur-Seine (FR)

( * ) Notice: Subject to any disclaimer, the term of this patent is extended or adjusted under 35 U.S.C. 154(b) by 1113 days.

(21) Appl. No.: 12/034,730

(22) Filed: Feb. 21, 2008

(65) Prior Publication Data

US 2008/0219748 A1    Sep. 11, 2008

Related U.S. Application Data

(60) Provisional application No. 60/907,005, filed on Mar. 16, 2007.

(30) Foreign Application Priority Data

Feb. 21, 2007  (FR) ...................................... 07 53416

(51) Int. Cl.
*A46B 11/00*      (2006.01)

(52) U.S. Cl. .......................... 401/129; 132/218; 264/401
(58) Field of Classification Search .................. 401/129, 401/268; 15/159.1; 132/218; 264/401
See application file for complete search history.

(56) References Cited

U.S. PATENT DOCUMENTS

| 4,712,936 | A | 12/1987 | Kessler |
| 5,753,171 | A | 5/1998 | Serbin et al. |
| 5,904,890 | A | 5/1999 | Lohner et al. |
| 6,324,438 | B1 * | 11/2001 | Cormier et al. ............... 264/401 |
| 6,343,607 | B1 * | 2/2002 | Gueret ........................ 132/218 |

* cited by examiner

*Primary Examiner* — Tuan Nguyen
(74) *Attorney, Agent, or Firm* — Jacox, Meckstroth & Jenkins

(57) ABSTRACT

The applicator is made of a material that is compatible with the cosmetic. In the manufacturing method, a digital model of the applicator is prepared, the material is conditioned in a raw form that is capable of flowing, and the material in raw form is solidified in slices that are defined by the digital model. The material in raw form is capable of being solidified by photopolymerization, in particular by means of a light source comprising a laser, or else by sintering, in particular by means of a heat source comprising a laser. The applicator is a mascara brush or comb, for example.

25 Claims, 6 Drawing Sheets

METHOD FOR MANUFACTURING A COSMETIC APPLICATOR, AN APPLICATOR, A PACKAGE INCLUDING THE APPLICATOR, AND A BATCH OF APPLICATORS

The present invention relates to a method of manufacturing a cosmetic applicator, the applicator, a package including the applicator, and a batch of applicators.

FIELD OF THE INVENTION

It applies in particular to manufacturing a cosmetic applicator for keratinous fibers, in particular the eyelashes or the eyebrows, for the skin, in particular the eyelids, the lips, or the cheeks, or even for the nails. The cosmetic can in particular be a liquid, a paste, or a powder.

BACKGROUND OF THE INVENTION

A first type of method of manufacturing an applicator is already known in the state of the art, in which method various individual components of the applicator are fabricated then assembled. When the applicator is a mascara brush, for example, both the bristles of the brush and a metal core of the brush are fabricated separately. Then, the bristles are fitted between two metal wires of the core, and the bristles are fastened in the core by twisting the wires in such a manner that the bristles are distributed helically around the core.

That type of manufacturing method therefore comprises a first step of fabricating the various individual components of the applicator, and a second step of assembling the individual components together.

A second type of method of manufacturing an applicator is also known in the state of the art, which method makes it possible in particular to avoid the assembly operation of the above-described method.

In the second type of method, the applicator is molded in such a manner that its various components are molded integrally with one another. To this end, a mold is initially made having a shape that is complementary to the shape of the applicator, e.g. by stacking up metal blades of appropriate outline. Then, material is inserted into the mold, e.g. by injection, in a state that makes it possible for it to flow within the mold. Finally, once the material has solidified inside the mold, the solidified material is unmolded. When, for example, the applicator is a mascara applicator comb comprising a core that carries teeth for applying mascara, the second type of method enables the core and the teeth to be molded in a single step.

However, the need to be able to unmold the applicator puts a limit on how complex the applicator can be in shape, in particular by disallowing applicator shapes with back draft.

In addition, since it is relatively expensive to make a mold, applicator shapes are varied little in order to limit the number of different molds that need to be made. This means it is not possible to envisage producing a variety of applicators adapted to the diversity of the consumers, said consumers having eyelashes of different lengths or of different stiffnesses.

OBJECTS AND SUMMARY OF THE INVENTION

An object of the present invention is to produce an applicator using means that are relatively simple and inexpensive and that make it possible to envisage a wide variety of applicator shapes, in particular shapes that are relatively complex.

To this end, the invention provides a method of manufacturing a cosmetic applicator, the applicator being made of a material that is compatible with the cosmetic, wherein:

a digital model of the applicator is prepared;

the material is conditioned in a raw form that is capable of flowing; and the material in raw form is solidified in slices defined by the digital model.

The term "material that is compatible with the cosmetic" means a material that is selected appropriately so that the cosmetic and the material of the applicator do not degrade each other, or degrade very slowly considering the expected lifetime of the applicator or of the cosmetic.

As for a molding method, the method of the invention makes it possible to manufacture the various components of an applicator in a single step, the various components being made integrally with one another.

However, the method of the invention does not require a mold to be fabricated, so it is possible to diversify the shapes of applicators easily and at little cost, with such shapes not being imposed by molds. If so desired, it is thus possible to produce a very large number of short manufacturing runs of different applicators.

In addition, the method of the invention makes it possible to manufacture an applicator of a shape that is relatively complex, said shape possibly having local back draft, since there is no unmolding step to disallow a shape with back draft.

Furthermore, since the material in raw form is solidified in slices, an applicator is obtained that presents surface irregularities, and that enables more cosmetic to be loaded onto the applicator than if the surface were completely smooth. In addition, when the material in raw form is powder, the applicator thus presents a granulated surface, and that also enables more cosmetic to be loaded.

A method of the invention may further comprise one or more of the following characteristics:

the material in raw form is a liquid or a powder;

the material in raw form is capable of being solidified by photo-polymerization, in particular by means of a light source comprising a laser;

the material in raw form is capable of being solidified by sintering, in particular by means of a heat source comprising a laser;

the material in raw form is placed in a receptacle that is provided with a support for the solidified material, and the support is displaced by steps that are equal to the thicknesses of the slices defined by the digital model;

the material in raw form comprises at least one component that is mixed, where appropriate, with an additive, the component being selected from a photopolymer resin, a sintering resin, a metal, and a metal alloy;

the applicator is a mascara brush or comb;

the method comprises the following successive steps: identifying at least one magnitude that is characteristic of a user of the applicator, e.g. the length of an eyelash or the shape of the outline of an eye; calculating at least one parameter of the applicator as a function of said characteristic magnitude; and preparing the digital model of the applicator in accordance with the calculated parameter.

The invention also provides a cosmetic applicator forming an element of a package that is ready for putting on sale, wherein the applicator is obtained by a method as defined above.

According to other characteristics of the applicator that are optional:

the applicator comprises a core of generally elongate shape that carries teeth that are made integrally with the core, the teeth being distributed in groups that are spaced apart from one another axially, the teeth of a single group being spaced apart from one another angularly around the core, the core being provided with at least one channel that forms a reservoir for loading with cosmetic, and that extends substantially axially between two angularly successive teeth of the groups, the channel being provided with an inner surface having a cross section that is delimited by an outline with back draft;

the groups of teeth are angularly offset from one another by an angular offset pitch that is substantially constant, the channel extending helically along and around the core;

the applicator comprises a core of generally elongate shape that carries teeth that are made integrally with the core, the teeth being distributed in groups that are spaced apart from one another axially, the teeth of a single group being spaced apart from one another angularly around the core, each of the teeth extending along a general direction having a radial component R and a tangential component T or −T, all of the teeth of a single group having a tangential component of the same sign, and the teeth of two successive groups presenting tangential components of opposite signs;

the applicator comprises a core of generally elongate shape that carries teeth that are made integrally with the core, the teeth being distributed in groups that are spaced apart from one another axially, with each tooth extending substantially parallel to a transverse plane of the core along a curved direction, the curvatures of the teeth being inverted in alternation from one group to another.

The invention also provides a batch of applicators, each applicator being as defined above, and including opposite first and second ends, wherein the applicators of said batch have their first ends connected in detachable manner to a common support.

The invention also provides a cosmetic package including an applicator for applying the cosmetic, wherein the applicator is as defined above.

Other objects and advantages of the invention will be apparent from the following description, the accompanying drawings and the appended claims.

BRIEF DESCRIPTION OF THE DRAWINGS

The invention can be better understood on reading the following description, given merely by way of example and made with reference to the drawings, in which.

MORE DETAILED DESCRIPTION

Figure 1:
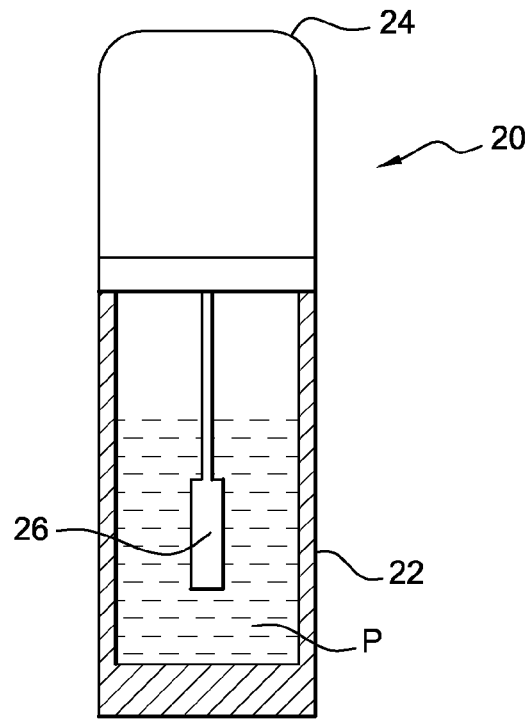
FIG. 1 is an elevation view, partially in section, showing a cosmetic package of the invention.

FIG. 1 shows a cosmetic package of the invention, given overall reference 20. The cosmetic is a mascara, for example.

The package 20, that is ready for putting on sale, comprises a body 22 that is closed by a cap 24 carrying an applicator 26 of the invention. The body 22 contains the cosmetic. Naturally, the applicator 26 is made of material that is compatible with the cosmetic.

The term "applicator" means a member comprising elements for loading and for applying a cosmetic (also known as teeth, bristles, etc) that are carried by a support (also known as a core, a stem, etc.). The applicator 26 forms a mascara brush or comb, for example.

Figure 2:
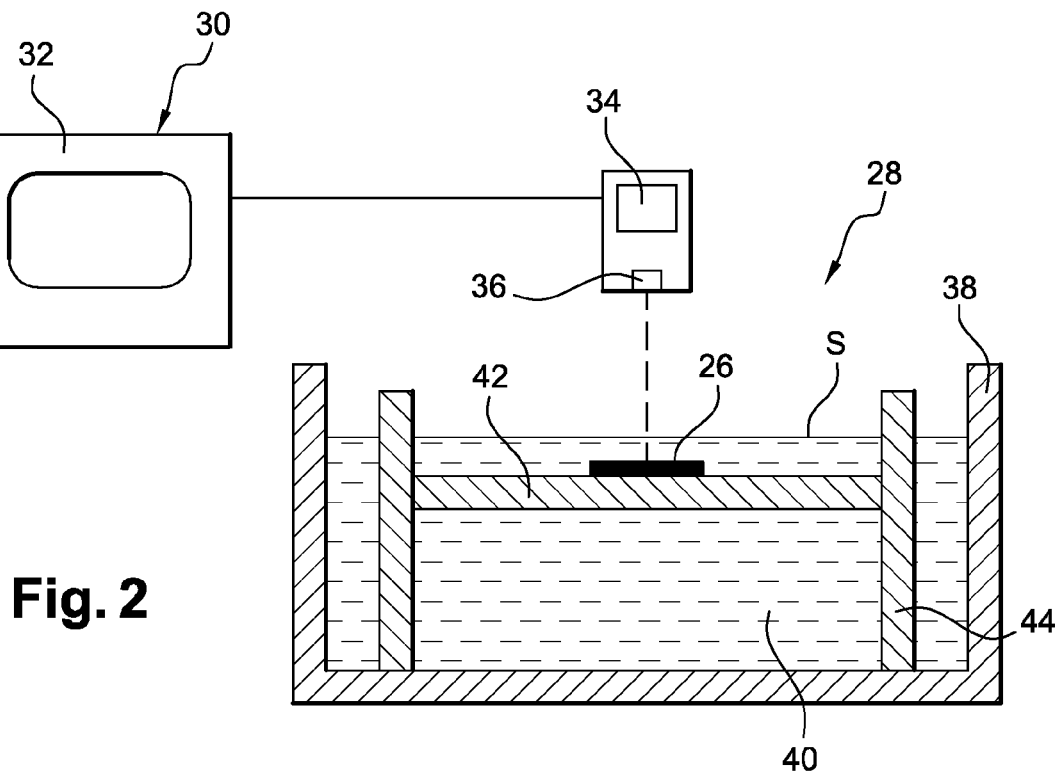
FIG. 2 is a diagrammatic view of an installation for implementing the method of the invention for manufacturing a cosmetic applicator.

The applicator 26 is manufactured in accordance with a method of the invention by means of an installation 28 that is shown diagrammatically in FIG. 2.

More particularly, the installation 28 is for implementing stereolithographic steps, or, in a variant, sintering steps.

The installation 28 includes means 30 for preparing a digital model of the applicator 26, said means comprising a conventional computer 32 in which computer assisted design (CAD) software known per se is installed, for example.

The installation 28 also includes a control module 34, e.g. of the programmable automatic type or of the PC type, for controlling optical means comprising a laser source 36.

The means 30 and the module 34 are interconnected in manner known per se, so as to be able to transmit the digital model of the applicator 26 from the computer 32 to the control module 34, e.g. in a standard format such as the STL (STereoLithography) format. The installation 28 also includes a receptacle 38 for containing a material in a raw form or material 40 that is capable of flowing, in particular in a liquid or powder form.

The material in raw form 40 is for solidifying in such a manner as to form the applicator 26.

During manufacture, the applicator 26 is carried by a support 42 that is housed in the receptacle 38 in such a manner as to be immersed below the free surface S of the material 40.

Using conventional means 44, the support 42 is displaceable parallel to a direction that is substantially perpendicular to the surface S.

In the manufacturing method of the invention, the applicator 26 is made as follows.

Firstly, a digital model of the applicator 26 is prepared, e.g. using the means 30 of the installation 28.

In addition, the material 40 for forming the applicator 26 is conditioned in a raw form that is capable of flowing.

It should be noted that for the material in raw form 40, it is possible to use a material comprising a photopolymer resin, a sintering resin, a metal, and/or a metal alloy.

The metal and/or metal alloy, preferably in the form of metal powders, can be selected from bronze, steel, cobalt-chromium, and titanium. The use of a metal material is particularly advantageous for manufacturing the applicator 26, in particular because of the ergonomic, esthetic, and functional properties of metal. Amongst other things, the possibility of conducting heat or electricity can impart novel functions to the applicator 26.

Where appropriate, the material in raw form 40 can be mixed with other components such as an additive and/or a photo-initiator.

In the embodiment shown in FIG. 2, the material in raw form 40 is a liquid that is capable of being solidified by means of the laser source 36 forming a light source.

After the receptacle 38 has been filled with material in raw form 40, said material 40 is solidified in slices that are defined by the digital model. The laser source 36 polymerizes the material 40 by being controlled in manner known per se by the control module 34.

In order to solidify the applicator slices successively, the support 42 is displaced by steps that are equal to the thicknesses of the slices defined by the digital model. Slices of constant thickness could be selected, for example. The more the number of solidified slices increases, the further the support 42 is driven into the material 40 in such a manner as to make it possible to solidify the layer of material 40 extending between the surface S and the last solidified applicator slice 26.

The thickness of the slices can be limited to a few nanometers, such that the applicator 26 manufactured in accordance with the method of the invention can be defined with very precise outlines.

Since the applicator 26 is manufactured by solidifying successive slices, the shape of the applicator 26 can be relatively complex, and, at least locally, can present outlines with back draft, and recesses or hollows that need not be open once the applicator 26 is finished.

In a variant, the material in raw form 40 can be a material that is capable of being solidified by sintering, in particular by means of a laser forming a heat source. In this variant, it is preferable to select a raw material that is in powder form.

The manufacturing method of the invention makes it possible to obtain an applicator 26 that is capable of forming an element of the package 20 that is ready for putting on sale. It should be observed that the applicator 26, manufactured in accordance with the method of the invention, presents characteristics, in particular mechanical characteristics, that are suitable for ensuring that the polymerized or sintered applicator 26 can be included in the package 20 for putting on sale.

Normally, in the state of the art, stereolithographic or sintering methods are used to manufacture highly technical elements or prototypes. Prototypes are intermediate products, in particular for fabricating a mold, that do not present characteristics, in particular mechanical characteristics, required of finished products for putting on sale.

However, the manufacturing method of the invention advantageously makes it possible to implement stereolithographic or sintering steps for obtaining applicator 26, products that are not highly technical, but that constitute finished products having characteristics that are adapted to their being put on sale.

The manufacturing method of the invention makes it possible to avoid using a mold, in particular by implementing stereolithographic or sintering techniques as used in the state of the art for fabricating a prototype for use in fabricating a mold.

Specifically, the manufacturing method of the invention makes it possible to obtain directly an applicator that has characteristics, in particular mechanical characteristics, that are adapted to its use, this being a result of the invention proposing that the material 40 normally used for manufacturing the applicator 26 be conditioned in a raw form that is capable of flowing, and that is adapted to the stereolithographic or sintering techniques.

It should be noted that the above-mentioned manufacturing method can include prior steps with a view to personalizing the manufactured applicator 26, in particular the following steps:

identifying at least one magnitude that is characteristic of a user of the applicator 26, e.g., the length of an eyelash or the shape of the outline of an eye of the user;

calculating at least one parameter of the applicator 26 as a function of said characteristic magnitude; and preparing the digital model of the applicator 26 in accordance with the calculated parameter.

Embodiments of applicators 26 that are suitable for being manufactured in accordance with the method of the invention are described below with reference to FIGS. 3 to 10.

In these figures, the analogous elements are designated by identical references.

Figure 3:
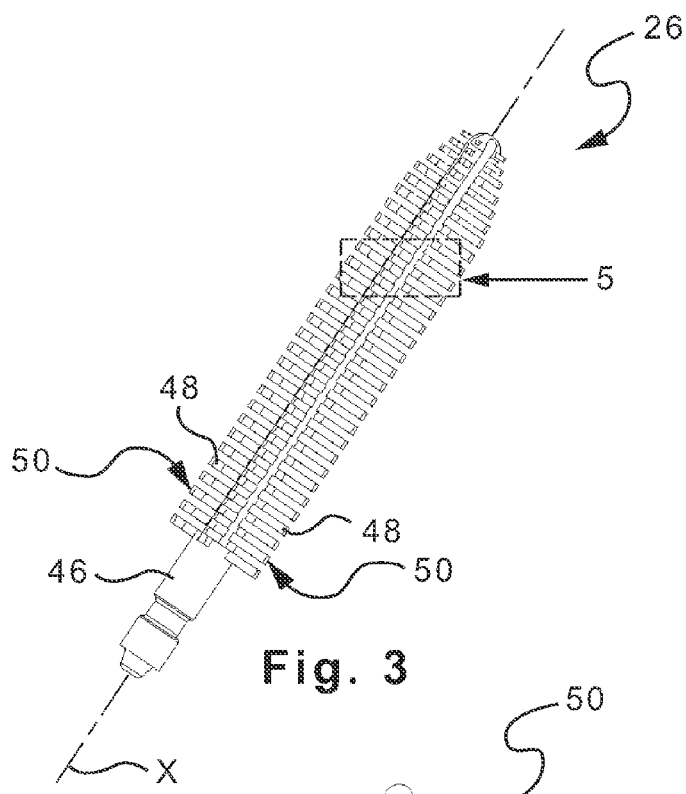
FIG. 3 is a perspective view of a cosmetic applicator constituting a first embodiment of the invention.
Figure 4:
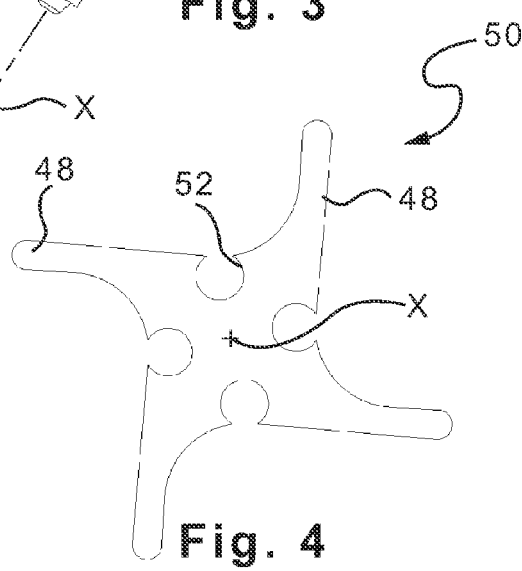
FIG. 4 is a cross-section view, on a larger scale than FIG. 3, showing the FIG. 3 applicator.
Figure 5:
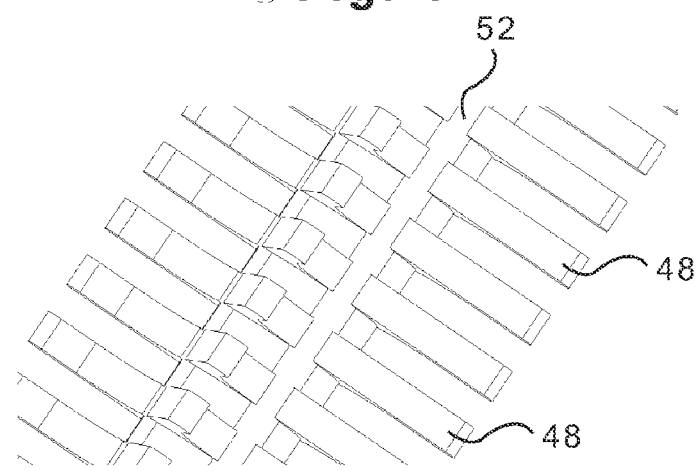
FIG. 5 is a view of a detail of the outlined portion 5 in FIG. 3.

FIGS. 3 to 5 show an applicator 26 constituting a first embodiment of the invention. The applicator 26 forms a comb for applying mascara.

The applicator 26 comprises a core 46 of shape that is generally elongate along an axis X, and that carries teeth 48 that are made integrally with the core 46.

As can be seen in FIGS. 3 and 4, the teeth 48 are distributed in groups 50. The teeth 48 of a single group 50 have the same axial position on the core 46. In the embodiment shown, a group 50 comprises four teeth 48 that are spaced apart from one another angularly around the core 46 and around the axis X (see FIG. 4). The teeth 48 of a single group 50 are angularly spaced apart from one another by an angular pitch of about 90°. The various groups 50 are axially spaced apart from one another by an axial pitch that is substantially constant.

The core 46 is provided with channels 52, e.g. that are four in number as shown in FIG. 4, forming reservoirs for loading with cosmetic. Each channel 52, shown in greater detail in FIG. 5, extends substantially axially between two angularly successive teeth 48 of the groups 50.

It should be observed that the channels 52 include an inner surface having a cross-section that is defined by a portion of a circle that extends over more than 180°.

Thus, the method of the invention makes it possible to obtain channels 52 in which the outline with back draft of the inner surface cannot be obtained by a conventional molding method.

Figure 6:
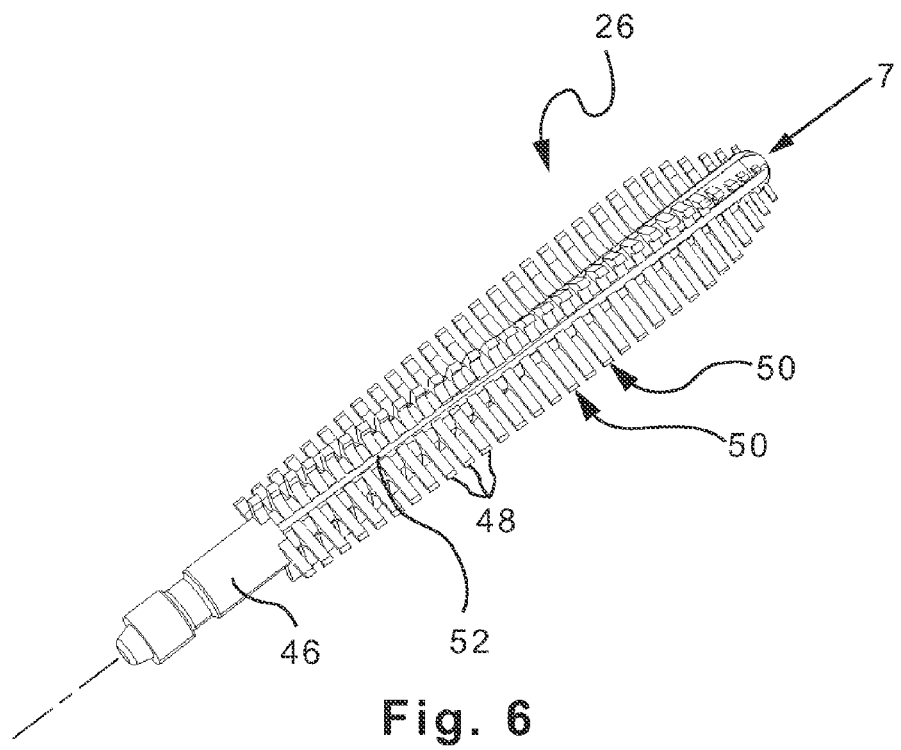
FIG. 6 is a view similar to FIG. 3 showing an applicator constituting a second embodiment of the invention.
Figure 7:
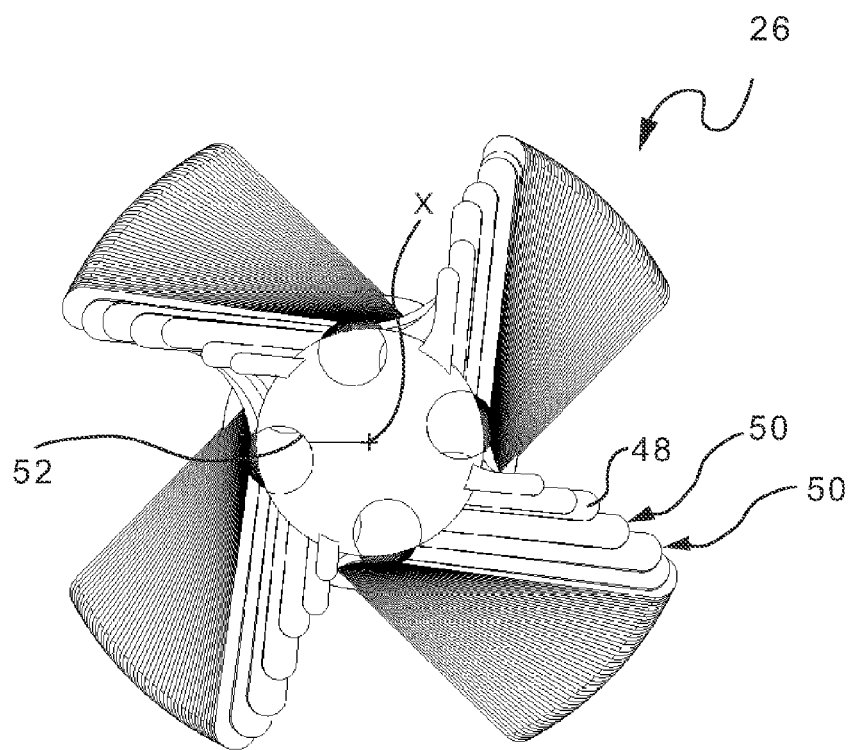
FIG. 7 is a view as seen looking along arrow 7, showing the FIG. 6 applicator.

FIGS. 6 and 7 show an applicator 26 constituting a second embodiment of the invention.

Unlike the above-mentioned embodiment, the groups 50 of teeth 48 are angularly offset from one another by an angular offset pitch that is substantially constant. The channels 52 extend helically along and around the axis X.

The shape of this applicator 26 also cannot be obtained by a conventional molding method.

Figure 8:
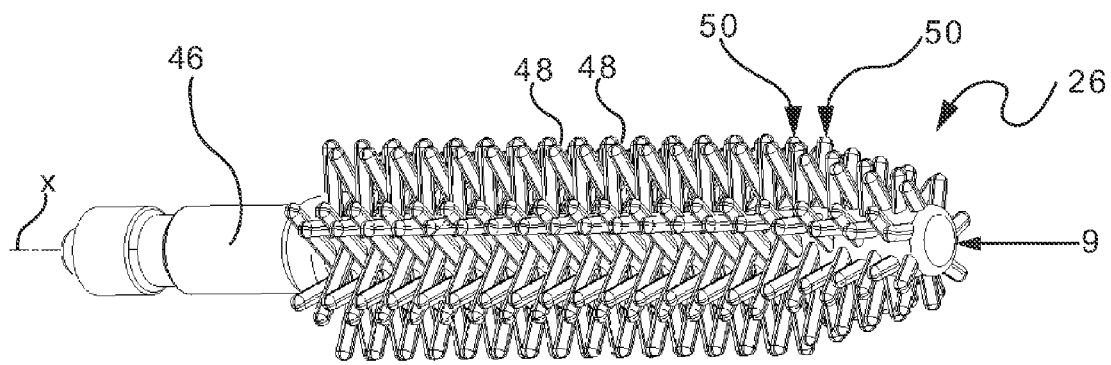
FIGS. 8 and 9 are views similar to FIGS. 6 and 7 showing an applicator constituting a third embodiment of the invention.
Figure 9:
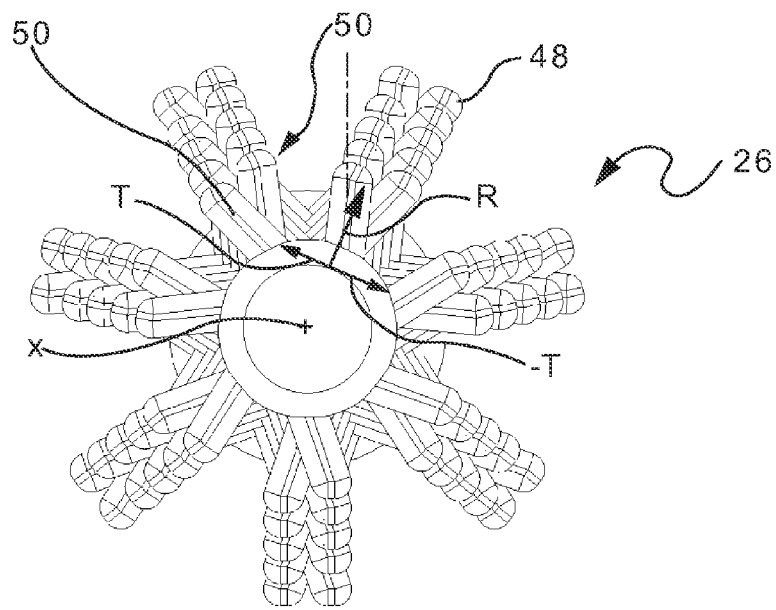

FIGS. 8 and 9 show an applicator 26 constituting a third embodiment of the invention.

In this embodiment, the applicator 26 forms a mascara brush.

In this third embodiment of the invention, each of the teeth 48 extends along a general direction having a radial component R and a tangential component T or −T.

All of the teeth 48 of a single group 50 have a tangential component of the same sign. However, the teeth 48 of two successive groups 50 present tangential components of opposite signs.

Such an arrangement of the teeth 48 on the core 46 forms overlapping teeth 48 that are favorable to loading cosmetic on the applicator 26.

Thus, the applicator 26 constituting the third embodiment, manufactured in accordance with the method of the invention, cannot be obtained by a conventional molding method.

Figure 10:
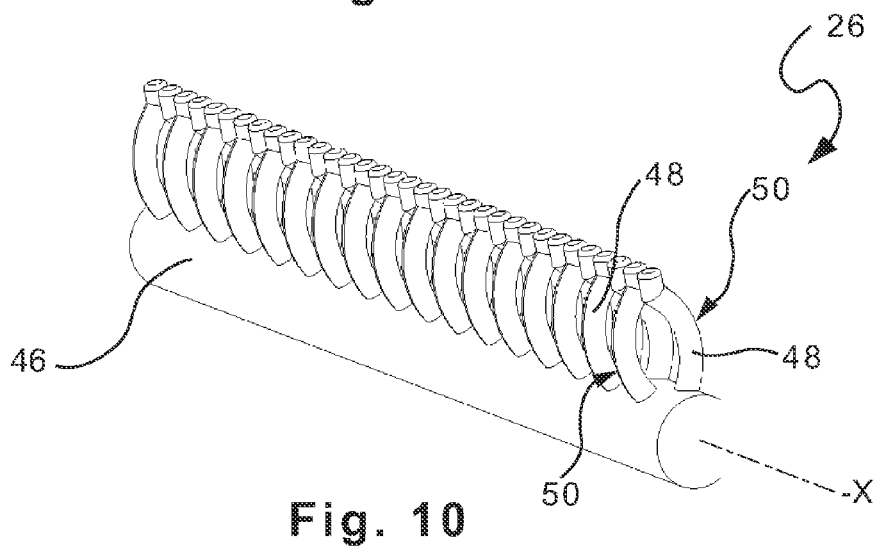
FIG. 10 is a perspective view of an applicator constituting a fourth embodiment of the invention.

FIG. 10 shows an applicator 26 constituting a fourth embodiment of the invention.

In this embodiment, the applicator 26 forms a comb for applying mascara, and each group 50 comprises only a single tooth 48.

In addition, the teeth 48 extend substantially parallel to a transverse plane of the applicator 26 along a curved direction. It should be observed that the curvatures of the teeth 48 are inverted in alternation from one group 50 to another.

Thus, the method of the invention makes it possible to obtain an applicator 26 as shown in FIG. 10 that cannot be obtained by a conventional molding method.

Figure 11:
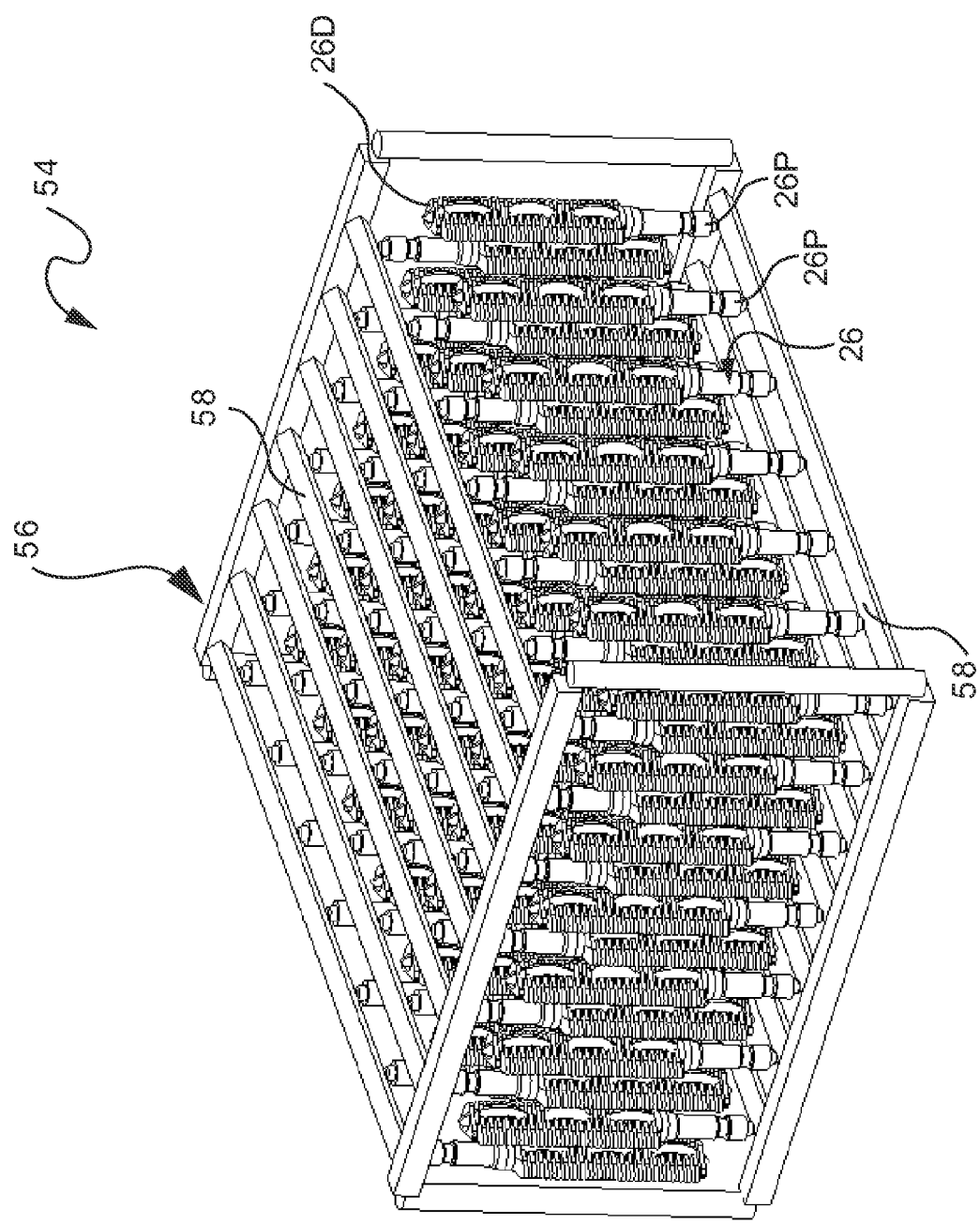
FIGS. 11 and 12 are perspective views of batches of applicators constituting two different embodiments of the invention.
Figure 12:
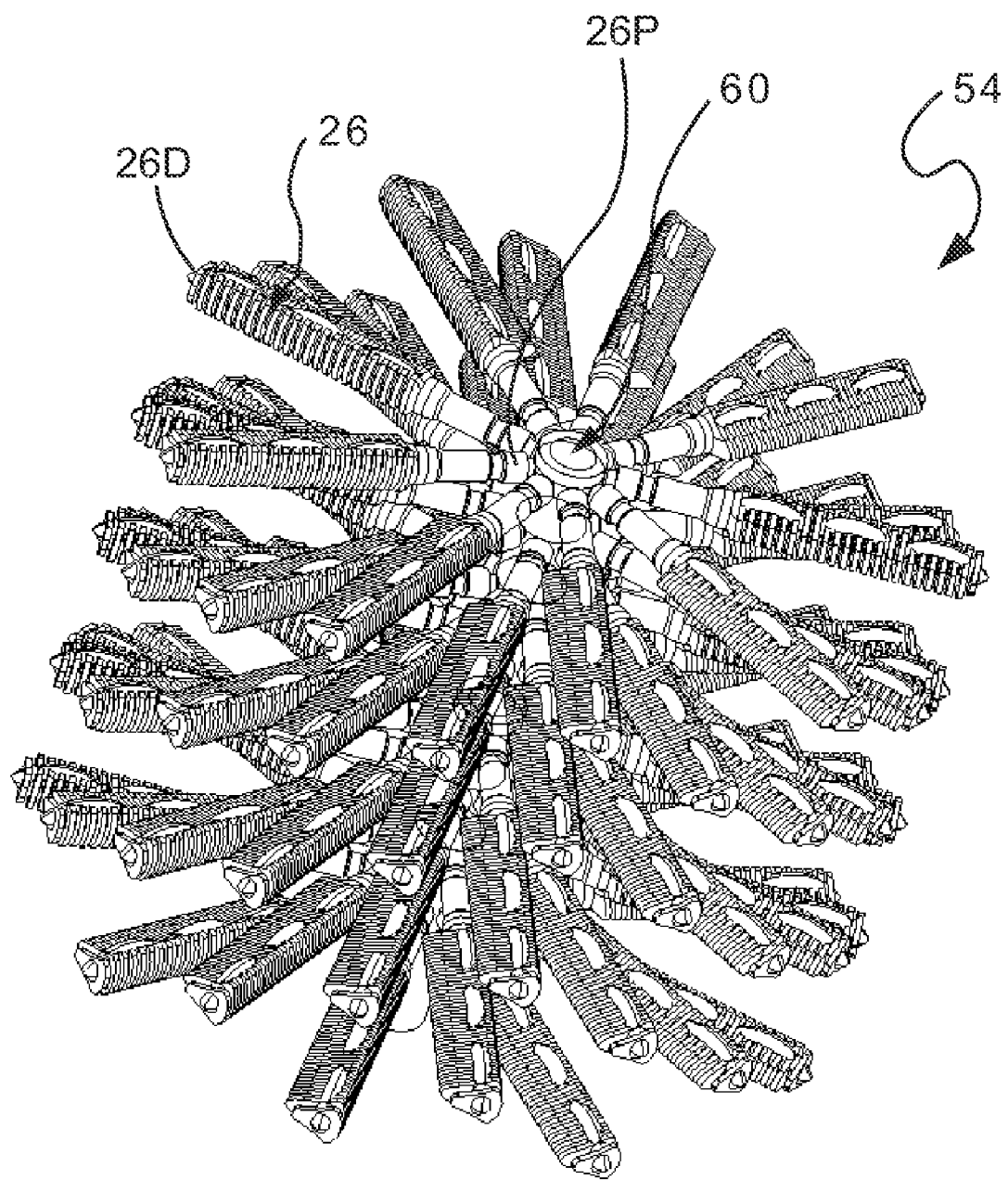

FIGS. 11 and 12 show first and second embodiments respectively of a batch 54 of applicators 26.

The batch 54 is obtained by a manufacturing method of the invention.

By way of example, the applicators 26 shown in FIGS. 11 and 12 form combs for applying mascara. Each applicator 26 includes a proximal first end 26P and a distal second end 26D.

The batch 54 constituting the first batch embodiment shown in FIG. 11 comprises a support 56 in the general shape of a rectangular cage having two opposite faces, each provided with substantially parallel bars 58.

The batch 54 shown in FIG. 11 includes at least two rows of applicators 26 parallel to the bars 58, e.g. 14 rows as shown. The proximal and distal ends 26P, 26D of the applicators 26 of a first row are disposed the opposite way round to the corresponding ends of the applicators 26 of a second row that is adjacent to the first.

The proximal ends 26P of the applicators 26 of a single row are connected in detachable manner to a common bar 58.

In the batch 54 constituting the second batch embodiment shown in FIG. 12, the applicators 26 are connected in clusters to a single rod 60 forming a support 42. The proximal ends 26P of the applicators 26 are connected in detachable manner, via their proximal ends 26P, to the rod 60.

The applicators 26 extend radially relative to the rod 60 in such a manner as to form star-shaped sub-assemblies that are spaced apart axially along the rod 60 and that are angularly offset from one another, e.g. by an angular offset pitch that is constant.

The batch 54 of applicators 26 as shown in FIG. 11 or FIG. 12 can be obtained directly in the receptacle 38 of the manufacturing installation 28.

Manufacturing applicators 26 in batches 54 as shown in FIG. 11 or FIG. 12 makes it easier to transport such applicators 26 to an assembly location for assembling them with the other elements of the cosmetic package 20.

Naturally, in a single batch 54, the shapes of the applicators 26 can vary from one applicator 26 to another.

Amongst the advantages of the invention, it should be noted that said invention makes it possible to manufacture cosmetic applicators 26 of shapes that are relatively complex, and out of a wide variety of elastic, plastic, or even metal materials.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of manufacturing a cosmetic applicator, the applicator being made of a material that is compatible with the cosmetic, wherein:
   - a digital model of the cosmetic applicator is prepared;
   - the material is conditioned in a raw form that is capable of flowing; and
   - the material in raw form is placed in a receptacle having a support and the material in raw form is solidified in slices that are defined by the digital model:
   - said solidified slices being integrally formed with one another and defining the cosmetic applicator.

2. The method according to claim 1, in which the material in raw form is a liquid or a powder.

3. The method according to claim 1, in which the material in raw form is capable of being solidified by photo-polymerization, in particular by means of a light source comprising a laser.

4. The method according to claim 1, in which the material in raw form is capable of being solidified by sintering, in particular by means of a heat source comprising a laser.

5. The method according to claim 1, in which the material in raw form is placed in a receptacle that is provided with a support for the solidified material, and the support is displaced by steps that are equal to the thicknesses of the slices defined by the digital model.

6. The method according to claim 1, in which the material in raw form comprises at least one component that is mixed, where appropriate, with an additive, the component being selected from a photopolymer resin, a sintering resin, a metal, and a metal alloy.

7. The method according to claim 1, in which the applicator is a mascara brush or comb.

8. The method according to claim 1, the method comprising the following successive steps:
   - identifying at least one magnitude that is characteristic of a user of the applicator, e.g. the length of an eyelash or the shape of the outline of an eye;
   - calculating at least one parameter of the applicator as a function of said characteristic magnitude; and
   - preparing the digital model of the applicator in accordance with the calculated parameter.

9. A cosmetic applicator, the applicator forming an element of a package that is ready for putting on sale, wherein the applicator is obtained by the method according to claim 1.

10. The applicator according to claim 9, comprising a core of generally elongate shape that carries teeth that are made integrally with the core, the teeth being distributed in groups that are spaced apart from one another axially, the teeth of a single group being spaced apart from one another angularly around the core, the core being provided with at least one channel that forms a reservoir for loading with cosmetic, and that extends substantially axially between two angularly successive teeth of the groups, said at least one channel being provided with an inner surface having a cross section that is delimited by an outline with back draft.

11. The applicator according to claim 10, in which the groups of teeth are angularly offset from one another by an angular offset pitch that is substantially constant, said at least one channel extending helically along and around the core.

12. The applicator according to claim 9, comprising a core of generally elongate shape that carries teeth that are made integrally with the core, the teeth being distributed in groups that are spaced apart from one another axially, the teeth of a single group being spaced apart from one another angularly around the core, each of the teeth extending along a general direction having a radial component R and a tangential component T or-T, all of the teeth of a single group having a tangential component of the same sign, and the teeth of two successive groups presenting tangential components of opposite signs.

13. The applicator according to claim 9, comprising a core of generally elongate shape that carries teeth that are made integrally with the core, the teeth being distributed in groups that are spaced apart from one another axially, with each tooth extending substantially parallel to a transverse plane of the core along a curved direction, the curvatures of the teeth being inverted in alternation from one group to another.

14. A batch of applicators, each applicator being according to claim 9, and including opposite first and second ends, wherein the applicators of said batch have their first ends connected in detachable manner to a common support.

15. A cosmetic package including the cosmetic applicator for applying the cosmetic as recited in claim 9, said cosmetic package comprising:
   a body that is closed by a cap:
   said body containing a cosmetic and adapted to receive said cosmetic applicator.

16. The method according to claim 1, wherein the method further comprises the step of:
   manufacturing a batch of cosmetic applicators, each applicator being manufactured with the method according to claim 1.

17. The method according to claim 16, wherein said batch of cosmetic applicators have shapes which can vary from one applicator to another.

18. A cosmetic applicator, the applicator forming an element of a package that is ready for putting on sale, wherein the applicator is obtained by the method according to claim 1, and in that the material in a raw comprises at least one component selected from a photopolymer resin, a sintering resin, a metal and a metal alloy.

19. The method according to claim 1, wherein said method further comprises the step of:
   causing the support to be displaced by steps equal to a thickness of said solidified slices, respectively, to solidify said slices.

20. The method according to claim 19, wherein said thickness of said solidified slices is the same.

21. The method according to claim 19, wherein said thickness of said solidified slices is different.

22. The method according to claim 1, wherein said method further comprises the step of:
   solidifying the slices of material using a light source.

23. The method according to claim 22, wherein said light source is a laser.

24. The method according to claim 19, wherein said method further comprises the step of:
   solidifying the slices of material using a light source.

25. The method according to claim 24, wherein said light source is a laser.

* * * * *